Jan. 26, 1943.　　C. E. WIESSNER　　2,309,229
REGULATOR VALVE
Filed Feb. 19, 1941

CHRISTOPHER E. WIESSNER
INVENTOR

BY
*Robert E. Woodhams*
ATTORNEY

Patented Jan. 26, 1943

2,309,229

UNITED STATES PATENT OFFICE 2,309,229

REGULATOR VALVE

Christopher E. Wiessner, Kalamazoo, Mich., assignor to Durametallic Corporation, Kalamazoo, Mich., a corporation of Michigan Application February 19, 1941, Serial No. 379,597

3 Claims. (Cl. 137—153)

This invention relates to hydraulic pressure regulators and has for its primary purpose the provision of simple and effective means for the maintaining of a constant and delicately balanced pressure within a hydraulic system throughout a wide range of pressure requirements. This invention, further, is a continuation in part of that described and claimed in my application filed December 29, 1939, and bearing Serial No. 311,517, of the series of 1935.

There exists in common industrial practice, a large number of situations where it is necessary to maintain a pressure in one hydraulic system in steady, continuous and delicate relationship with the pressure in another hydraulic system. It also happens in industrial practice that it may be necessary to maintain a pressure in a hydraulic system in steady and continuous adjustment according to a certain pre-determined pressure. It even happens that in some installations it is not known which situation will be preferable until the system is actually put into operation, and, hence, a simple means for effecting such regulations and which means may be readily adaptable to either of the above named modes of regulation, will be found to be highly desirable.

While by no means the only situation in which such regulation is desirable, for purposes of illustration it will be convenient to refer to the field of operating mechanical seals in the stuffing boxes of rotary pumps. Here it is necessary to maintain a pressure within the stuffing box of the pump and behind the seal, by which the seals will be kept in operative position and aided in resisting the pressure within the pump. In this system, it is sometimes found desirable to regulate the pressure within the stuffing box of the pump behind the seals according to a certain pre-determined pressure, but where the pressure within the pump is variable it is desirable to regulate the pressure within the stuffing box of the pump according to the pressure variations of the pump. For a system illustrating more completely this situation and means for meeting it, reference is invited to my application Serial No. 373,286, filed January 6, 1941.

At the present time, there are on the market a large number of regulating valves of many different kinds. Most of them depend upon some sort of diaphragm for their nucleus of operation and there are, in fact, a few which have a piston and a slot-orifice, which latter may, at first glance, be thought to bear some resemblance to the herein disclosed regulator. However, of these devices on the market, for one reason or another, all fail to fill the above described needs. Some of them have been built for only low pressures and thus their adjusting mechanism has been accordingly limited. Some regulators have in any case only a short range of pressures under which they are capable of operating and, hence, will not meet the widely variant conditions which exist in industrial application and, particularly, in the application of mechanical seals as above indicated. Other regulators are extremely large and clumsy and while they might work for the purpose indicated, their cost is great and hence closely restricts their use. The herein disclosed regulator is small in that it can be readily made of a maximum over-all length of eight or nine inches, it can be made inexpensively and easily, will not get out of order and a single unit will operate over a pressure range of zero to twenty-five hundred pounds per square inch. It is readily convertible from a type which will regulate according to a fixed, pre-determined pressure or a type which will regulate in response to the pressure existing within another hydraulic system.

As a further consideration, it has been found that in presently known types of regulators any dirt or scale which may exist or develop within the pipe may lodge within the orifice of the pressure regulating device and thus clog the system. It is accordingly desirable to develop a type of regulator which will automatically adjust itself to compensate for any such obstruction and which, when obstruction is cleared away, will again adjust itself to normal position.

Accordingly the principal object of my invention is to provide a simple and effective pressure regulator having a wide range of pressure responsiveness.

Another object of the invention is to provide a valve of the regulator type which is effective to control delicately and constantly a pressure in one hydraulic system in constant and immediate response and correlation to the pressure in another hydraulic system.

Another object of the invention is to provide a valve of the regulator type which is effective to control accurately and precisely pressures in a hydraulic system and is so constructed in its major portions that it can be readily and easily converted by simple exchange of minor parts from a valve of adjustable manual control to a valve which varies its control according to variations in another hydraulic system without removing the principal part of the valve from the system.

Another object of the invention is to provide a valve having the above desirable characteristics which is simple and inexpensive to manufacture, and effective and reliable in operation.

Another object of the invention is to provide a valve having the above desirable characteristics which has also a capacity for controlling with complete accuracy and without auxiliary equipment pressures ranging from zero to twenty-five hundred pounds per square inch.

A further object of my invention is to provide a pressure regulator which will regulate pressures accurately through a wide range of effective pressures with the passing, however, of only a small volume of liquid under regulation through said valve and through said system. All presently known regulators require, to secure a range even as great as provided by 20 my herein disclosed valve, the passing of a volume of liquid several times greater than required by my valve. Thus with my equipment the pressure pump of a pressure system may be substantially smaller, by which it is possible to reduce both the initial cost and the operating cost of such system.

Another object of the invention is to provide a valve having the above desirable characteristics which will automatically adjust itself under any circumstances of control or pressure smoothly and immediately and without material variation in pressure to compensate for, and maintain constant pressure when, particles of dirt or flakes of pipe scale become lodged within the pressure controlling orifice, and, further, which will restore itself to its former adjustment with equal smoothness and promptness when such obstructing matter is removed.

Another object of the invention is the provision of a valve of the regulator type which will adjust itself promptly and smoothly under any conditions of pressure to any changes in the viscosity of the pressure fluid and including such changes in viscosity as occur by reason of changes in operating temperature, whether caused by changes in external conditions or by the warming up of the fluid in the course of operation.

The above being among the objects of the present invention, the same consists in certain novel features of construction and combination of parts to be hereinafter described with reference to the accompanying drawing, and then claimed, having the above and other related objects in view.

In the accompanying drawing there is shown a certain form of my regulator valve which form has been selected for the purpose of illustration, but which is not the only way in which my invention may be practiced. Upon a careful examination of the drawing, together with a reading of the hereinafter following disclosure, there will at once become apparent to one skilled in the art many modifications and variations of the embodiment of the valve as shown herein, some of which variations may even be improvement hereon but of which all will be within the scope of my invention as herein disclosed.

In said drawing.

Inasmuch as one typical use of this valve involves an oil circulating hydraulic system, oil will hereinafter be referred to as the fluid circulating through the pressure system upon which the control is to be exercised, but it should be clearly understood that this is by way of example only and is merely taken for purposes of explanation and illustration. In the same manner propane may be selected as a material being pumped through an oil refinery and hence it may be taken as the material in the hydraulic system which is exercising the control in the situation to which the form shown in Figure 1 is applicable, but this likewise is solely by way of illustration and should not in any way be construed as limiting.

Figure 1:
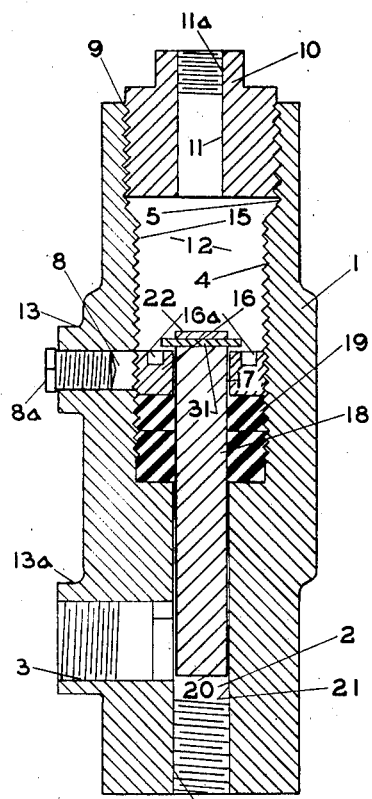
Figure 1 represents a cross-sectional view taken through an axial plane thereof. This form shows my regulator valve assembled for operative control according to the pressure maintained in another hydraulic system.
Figure 3:
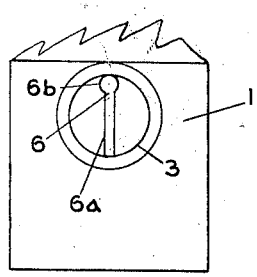
Figure 3 is a broken view of the bottom of my regulator valve in either of the forms shown, and showing particularly the shape of the escape orifice.

Referring first to Figures 1 and 3, the numeral 1 represents the body part which has a bore 2 extending partway through said body part and threaded at one end 2—a for pipe connection but smooth throughout the rest of its extent; a bore 3 in the side of said body part but cut only partway through the same and threaded for pipe connection; a bore 4 communicating with bore 2 and axial therewith but of larger diameter and threaded as hereinafter described in more detail and a bore 5 communicating with bore 4 and axial therewith but of slightly larger diameter than bore 4 and pipe threaded as shown at 9. Pipe threading is preferred at this point instead of standard threading in order to prevent leakage of liquid from the interior of body part 1. Otherwise any threading is satisfactory. At 6 there appears a slot, or orifice aligned parallel with the axis of said bore 2 and which is quite narrow. It has parallel sides throughout most of its length as at 6—a and an enlarged portion of substantially circular cross-section at 6—b. This slot provides the sole communication between bore 2 and bore 3.

At 8 there is a small bore providing communication between bore 4 and the exterior of the body part 1 and said bore may be threaded as shown for pipe connection. The threading at 9 is provided to accommodate interchangeable pipe plugs 10 and 23. Pipe plug 10 has bore 11 threaded for pipe connection in its upper end at 11—a and communicating with the inner chamber 12 of body part 1 defined by bores 4 and 5. Bosses 13 and 13—a are preferably placed on body part 1 as shown but are optional. Bore 4 is threaded at 15 to receive screw type packing gland 16 and enable it to be screwed down into said chamber from the top thereof. This threading is of standard threads.

Gland 16 is threaded to engage the threads 15 of chamber 12, is drilled at its top as at 16—a or provided with lugs to receive a spanner wrench, and it has bore 17 therethrough of size to accommodate snugly the piston 18. Packing 19 is any highgrade packing material and may be of one or more units. It is packed tightly into the bottom of chamber 12 and around piston 18.

As shown, piston 18 fits snugly but slidably within bore 2 and is long enough that when its lower end 20 is at lower end 21 of bore 2, its top end 22 is still above the top surface of gland 16.

Orifice 6 is cut by working through bore 3 and is cut so that part 6—a has sides which are both smooth and parallel and the enlarged part at 6—b by drilling a small hole at the top end of part 6—a. Enlarged part 6—b must, similarly to part 6, be smooth and regular and both 6—a and 6—b must blend smoothly together. It should be observed that sometimes the necessities of certain uses of this valve such as for stuffing box pressure regulation requires that the pipe fitting into bore 3 be not more than ⅟₁₆ to ¾ inch exterior diameter and hence the space within which slot 6 can be made is definitely limited. Part 6—a of orifice 6 is in the case of the above mentioned pipe sizes preferably, but not necessarily, made about ₃₂ inch wide. All of these dimensions, however, are relative only and for illustrative purposes drawn from the said stuffing box use of this valve, and are in no sense critical or limiting, for in other conceivable installations this valve might be of wholly different size. In any situation, however, it will be seen that the length of orifice 6 is limited by the size of pipe selected to fit into bore 3.

After assembly of the valve as appears obviously from the drawing, the valve is installed with the pipe providing the inlet of the liquid whose pressure is to be held under control inserted at 2—a and the pipe providing the outlet from the valve for said liquid inserted at 3. At 11—a there is inserted the pipe carrying statically the liquid from the system whose pressure is controlling. This pipe when used with a pump is preferably connected at or near the discharge side of the pump (not shown) but it may be connected to the controlling system at any point from which the pressure is desired to be taken for the control purpose. In this form, the pipe plug 8—a is by pipe thread connection inserted into the bore 8 in order to close the same to prevent the escape of fluid thereby from chamber 12.

Pin 31 is inserted through the head of piston 18, or the head of said piston may be enlarged to a diameter greater than that shown for the greater part of piston 18, in order to limit the travel of the piston downward in the form as shown in Figure 1. It should be noted, also, that in some applications the bore 11 is often greater in diameter than the diameter of piston 18 and, hence, a pin 31 or similar means may be necessary to prevent the piston 18 from being forced outward of the valve through bore 11 in the event that the pressure at 11—a is reduced or removed.

The valve operates as follows. Pressure in the controlling system pushes a part of the liquid therein, as the above mentioned propane, through the connecting pipe and into the valve through opening 11. This fills chamber 12 above packing gland 16 and exerts a static pressure upon the top of piston 18 and accordingly forces said piston downward to cover all of orifice 6. As pressure is applied in the system being controlled, the liquid, as oil, enters through bore 2 and pushes piston 18 upwardly against the static pressure in chamber 12. When, however, piston 18 has moved upwardly sufficiently to uncover a portion of orifice 6, the oil then flows out through same. This release of the oil controls the extent to which pressure can build up in the system connecting at 2—a. Obviously, the piston 18 will move upwardly sufficiently to uncover orifice 6 and thus release oil therethrough in increasing quantity until the pressure in both systems is equalized and the piston ceases to move. When pressure drops to zero at 11, piston 18 moves upwardly to uncover all of orifice 6, including the enlarged portion 6—b, and this latter permits oil to flow through the regulator rapidly enough to dispose of all the oil being urged through this system and its pressure therefore drops to zero. As pressure increases at 11, the piston 18 is forced downwardly, thus reducing the opening offered by orifice 6 and thus creates at 2—a a continually higher pressure to dispose of the constant volume which is being put through the oil system. Thus, the slightest variation in the pressure at 11 will at once react to move piston 18 upward or downward to make an instantaneous and corresponding alteration in the pressure at 2—a. Thus, further, by making the orifice-slot 6 small and narrow, the pressure in the controlled system will be delicately and accurately controlled with but a very small volume required to move therethrough.

It will be appreciated that it is often required that an installation be small and yet capable of handling both high pressures and a wide range of pressures. This is true particularly where the full length of the slot 6 must, as above indicated, be not greater than the interior diameter of a pipe whose exterior diameter must often be as small as ⅟₁₆ of an inch. In these situations, it has been found difficult to reduce the pressure all of the way to zero. Hence, as above indicated, the enlarged opening 6—b permits all of the oil to escape through the orifice, and the pressure thus drops to zero. It acts as a safety measure to make sure that the pressure will drop to zero when the piston 18 has moved up an appropriate distance, while still permitting a smooth and regular gradation of pressure as the piston passes the portions of the slot whose sides are mutually parallel. Thus the valve herein disclosed will regulate smoothly and definitely pressure throughout a wide range of pressures corresponding to the mutually parallel parts of slot 6, and yet the valve by the enlarged opening 6—b will be capable of releasing all pressure when the piston has moved sufficiently upward to uncover said enlarged parts 6—b of orifice 6.

While the above description assumed that the pressure was imposed first at 11—a and then imposed at 2—a, it is obvious that the reverse procedure may be employed; namely, starting the pressure fluid through the system entering at 2—a and exiting at 3 and then imposing the pressure at 11. The choice of these methods will obviously depend upon the type of system in which the regulator is being used.

Figure 2:
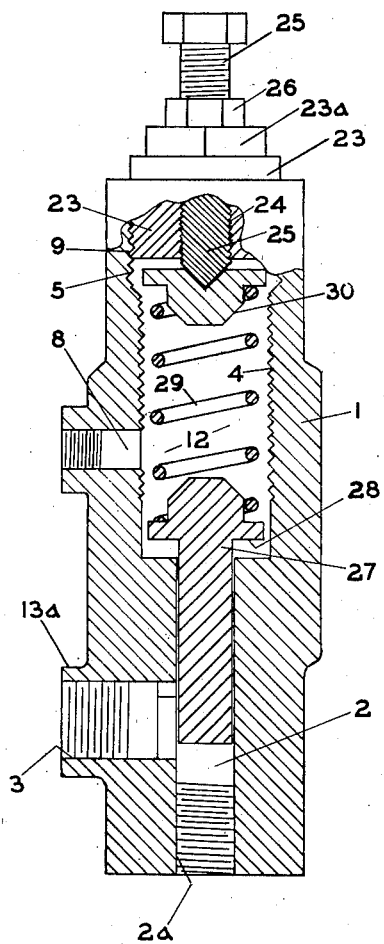
Figure 2 is a partial sectional view of my regulator valve and showing the same assembled for regulation according to a fixed pre-determined setting.

In the form shown in Figure 2, the body part 1 is the same as in Figure 1 and its installation into the system to be controlled at 2—a and 3 is the same. In this application, however, plug 10, packing gland 16, packing 19, piston 18 and plug 8—a are removed therefrom and the hereinafter mentioned parts inserted. Pipe plug 23 is inserted in place of pipe plug 10 and is tightened by nut-like integral portion 23—a. Plug 23 has bore 24 therein fitted with standard threads for the reception of adjusting screw 25. Nut 26 is for locking purposes. Piston 27 fits snugly but slidably into bore 2 and rests against the bottom of chamber 12 by its head 28. Upon head 28 of said piston there rests spring 29 upon which there is pilot washer 30 which bears against the bottom end of screw 25. A pipe may be inserted into bore 8 to lead back into the system any oil which comes from 2—a past piston 27 into chamber 12.

The operation of this assembly follows a principle similar to that of the assembly of Figure 1. By setting the screw 25, and locking the same with nut 26, at any desired point, any determinable compression may be placed on spring 29. Thus spring 29 will exert a controllable pressure upon the top of piston 27. As oil under pressure enters at 2—a and exerts pressure upon the bottom of piston 27, the same is moved upward until a portion of orifice 6 is uncovered, whereupon the oil flows out to the discharge at bore 3 for return to the low pressure side of the pump. At a certain point, enough of orifice 6 is uncovered so that at the then existing pressure, the entire volume being forced by the pump will flow through opening provided by orifice 6 below piston 27. At this point, the opposing pressures at 2—a and of the spring 29 are equal.

As flakes of scale or particles of dirt get into the system and clog orifice 6, the only result in either case is to force the piston 18 or 27 upward to uncover enough more of the orifice 6 to compensate for the clogging. When the particle is finally dislodged, the piston drops back downward to reestablish the orifice at the proper size. When the viscosity of the fluid at 2—a, as oil, changes for any reason, it will accordingly pass more or less easily through the orifice 6, and piston 18 or 27 will move upward or downward to establish a new size of orifice which will pass the necessary volume at the pressure imposed at the top of the piston.

Hence it is seen that any changes in pressure of the controlling system (in the case of the Figure 1 situation), appearance of particles to clog the orifice 6, changes in viscosity of the liquid are all immediately and accurately compensated for. This is important, for in systems acting under very high pressures, as two thousand pounds per square inch, the occurrence of any such event would react upon the system so suddenly that even an operator in constant attendance could not adjust a hand valve quickly enough to prevent trouble.

It will be seen also that by installing the body part 1 into the line of the fluid over which control is being exercised, the control may be readily converted from the form shown in Figure 1 to that shown in Figure 2, and vice versa, without removing said body part from the system. To do such, it is only necessary to withdraw pipe plug 10, piston 18, gland 16, packing 19 and plug 8—a from the form of the valve as shown in Figure 1, and insert therein the members shown for the form of Figure 2; namely, piston 27, spring 29, guide member 30, pipe plug 23, screw 25 and locking nut 26. Hence, a regulator valve has been provided which may readily and quickly be changeable from one form of regulation to the other as above indicated without removing the same from the system into which it is installed.

While it will be apparent that various changes may be made in details of the structure herein disclosed and described, the reader hereof should be warned that the precise construction of orifice 6 is delicately determined and very few liberties can be taken with it. In this position, I have tried to use triangular openings and openings of various progressively changing contours and I have also tried to use passage means consisting of a series of small round openings, both aligned parallel with the axis of bore 2 and arranged spirally around said axis. I have found that all of these are absolutely unworkable due, apparently, to the extremely high pressures and small volume for which this apparatus is designed, together with the wide range of pressures over which it is intended to operate. Although the reason for this may not be obvious at first glance, when it is observed that at one thousand pounds per square inch pressure that oil of ordinary light viscosity flowing at the rate of two quarts per minute through an orifice having its portion 6—a only $\frac{1}{32}$ of an inch wide, will force the plunger upward to make an opening only about $\frac{1}{32}$ of an inch high. In these small dimensions, a triangular or similar form becomes impractical to machine and a series of small holes give a gradation of pressures far too irregular to be of any practical use. Likewise, with a series of holes, when one becomes clogged by pipe scale or dirt within the system, there is no way for the opening to be increased by which to clean the obstructing matter out of the hole and further, in the form shown in Figure 2, it is necessary for the pressure to increase the size of the opening sufficiently so that the piston may move upward against the spring to uncover the next hole. Hence, an even pressure will not be maintained. Therefore, although I wish expressly to call attention to the fact that many variations may be made in my valve as herein disclosed, I feel it essential to state in connection therewith the certain above indicated limitations upon the making of variations in the shape of orifice 6.

Generally speaking, in making variations in this valve, it must be kept in mind throughout that the valve as I have designed it is intended for extremely small volumes at a wide range of pressures extending from zero into the neighborhood of twenty-five hundred pounds per square inch. Accordingly, the orifice 6 must be kept small and narrow and the pressure adjusting mechanism for the head of the piston must be capable of wide variations and of imposing high pressures.

Although specific embodiments of the present invention are shown in the accompanying drawing and described in the foregoing specification, it will be apparent that certain features thereof are capable of independent use and that, subject to the above detailed limitations, various modifications and changes may be made in the various parts and features of the structure and, accordingly, it will be understood that changes may be made in the specific embodiments of the invention described without departing from the spirit or substance of the broad invention, the scope of which is commensurate with the appended claims.

I claim as my invention:

1. An hydraulic regulating valve adapted to regulate the pressure of fluids over a wide range of effective pressures while passing a small volume of pressure fluid therethrough, comprising a valve body having a longitudinal bore and a cross-bore communicating therewith through a slot formed in said body and which is elongated in the direction of the axis of the longitudinal bore, said slot being narrow in width and parallel-sided throughout the greater portion of its length and terminating in a substantially enlarged end portion, a cylindrical valve member slidable in said bore and having one end movable along said slot to cover and uncover the same, and means normally operative through the other end of the valve member for controlling movement of the valve member along the parallel-sided portion of said slot thereby to regulate the pressure of the fluid in the bore to the inlet side of said slot, said means being further operative to cause the valve member to uncover the enlarged end portion of the slot thereby to release said pressure.

2. An hydraulic regulating valve as set forth in claim 1, wherein the means for controlling movement of the valve member along said slot includes an open-ended chamber formed in the valve body into which said other end of the valve member extends, and a removable plug closing said open end and providing connection between said chamber and a source of control fluid pressure.

3. An hydraulic regulating valve as set forth in claim 1, wherein the means for controlling movement of the valve member along said slot includes an open-ended chamber formed in said valve body into which the other end of the valve member extends, a removable plug closing said end, and spring means disposed in said chamber and operative between said plug and said other end of the valve member for applying a control pressure on the latter.

CHRISTOPHER E. WIESSNER.